United States Patent Office 3,746,666
Patented July 17, 1973

3,746,666
WATER ABSORBABLE RIGID URETHANE
FOAM COMPOSITIONS
Gerald Wayne Neal and Llewellyn Delphin Booth, Lake Jackson, Tex., assignors to The Dow Chemical Company, Midland, Mich.
No Drawing. Filed Aug. 2, 1971, Ser. No. 168,366
Int. Cl. C08g 22/14, 22/46
U.S. Cl. 260—2.5 AD      4 Claims

ABSTRACT OF THE DISCLOSURE

Water absorbable rigid polyether polyurethane foam compositions useful as floral foams, baffles and filters are prepared by subjecting to foaming conditions a composition comprising (A) an amine initiated, highly branched polyether polyol, (B) a highly branched hydroxyl initiated polyether polyol, (C) a lightly branched hydroxyl initiated polyether polyol and (D) a polymethylene polyphenyl isocyanate.

---

This invention relates to water absorbable rigid polyurethane foams and more particularly concerns rigid polyether urethane foams which are characterized as having the ability to absorb 70% by volume of water when immersed therein for 3 minutes, to foamable compositions which when subjected to foaming conditions produce such foams and a process for their production.

The rigid polyether polyurethane foams of the present invention are prepared by intimately admixing in the conventional manner a foamable composition comprising:

(A) at least about 20 percent by weight based upon the total weight of components A, B and C of an amine initiated, highly branched polyether polyol having a hydroxyl group to molecular weight ratio of at least 1:333, (B) from about 0 to about 46 percent by weight when the combined weight of A and B is greater than about 86.5 percent but less than about 92 percent and from about 0 to about 63 percent by weight when the combined weight of A and B is greater than about 86.5 percent, said quantity of B being based upon the total weights of components A, B and C of highly branched hydroxyl initiated polyether polyol having a hydroxyl group to molecular weight ratio of at least 1:333, (C) from about 9 to about 50 and preferably from about 10 to about 33 percent by weight based upon the combined weight of A, B and C of a lightly branched polyether polyol having a hydroxyl group to molecular weight ratio of less than about 1:500, (D) a polymethylene polyphenyl isocyanate having an average functionality of from about 2 to about 3.2 and preferably from about 2.1 to about 2.8, (E) from about 0 to about 2.4 percent by weight based upon the combined weight of components A, B and C of water, (F) a volatile organic blowing agent, (G) from about 0 to about 0.5 percent by weight based upon the combined weight of A, B and C of a catalyst for urethane formation, and (H) a silicone oil cell control agent;

wherein the isocyanate, component D, is employed in a quantity that will provide an NCO:OH ratio of from about 0.5:1 to about 0.9:1 and preferably from about 0.6:1 to about 0.8:1.

The foams of the present invention may be prepared by mixing together the previously described foamable composition and placing the resultant mixture into an open container such as a box or other open vessel or moving troughs or conveyers wherein the composition is permitted to rise freely.

The water absorbable polyurethane foams of the present invention are useful as floral foams, baffle foams and filter foams.

The floral foams are additionally characterized as possessing the ability to absorb and retain at least about 60% by volume of water (preferably at least about 85%). These foams are particularly useful in the fresh-cut flower industry in that they not only provide water necessary to prolong the decorative life of the fresh cut flowers but may also serve as the "frog" i.e. the device employed to maintain the flowers in an arranged decorative position.

Those foams of the present invention which absorb and readily release the absorbed water are particularly useful as baffle or filter foams. The baffle foams would be particularly useful as an "anti-sloshing" media in fuel tanks for aircraft and the like. The filter foams are useful as filters for removing particulate matter from fluids, i.e. gaseous and/or liquid media.

The density of the foams may be varied in the usual manner by varying the quantity of blowing agent. The density variations are believed to affect the cell size which would tend to vary the use of the foams in filter applications as to the size of particulate matter which could be removed from the fluid employed. The particular speed with which liquids can be filtered through the foam can be varied by the application of pressure and vacuum means.

Suitable amine initiated, highly branched polyether polyols which may be employed as component A of the foam compositions of the present invention include those reaction products of an amine having from about 2 to about 5 active hydrogens as determined by the Zerewitinoff method such as for example ammonia, ethylene diamine, aminoethylethanolamine, 2 - aminoethanolamine, N-methyldiethanolamine, diethylenetriamine, tris(hydroxymethyl)aminomethane, benzene sulfonamide, mixtures thereof and the like with a vicinal alkylene oxide or a halogenated derivative thereof having from about 2 to about 4 carbon atoms such as, for example, ethylene oxide, propylene oxide, 1,2-butylene oxide, epichlorohydrin, mixtures thereof and the like and wherein the resultant product has a number of hydroxyl groups to molecular weight ratio of at least about 1:333.

Suitable hydroxyl initiated, highly branched polyether polyols which may be employed as component B of the present invention include those reaction products of a polyhydroxyl containing compound having from about 2 to about 8 hydroxyl groups, such as, for example, glycerine, sucrose, sorbitol, trimethylolpropane, mixtures thereof and the like with a vicinal alkylene oxide and halogenated derivatives thereof, having from about 2 to about 4 carbon atoms such as, for example, ethylene oxide, propylene oxide, 1,2-butylene oxide, epichlorohydrin, mixtures thereof and the like, and wherein said product has a hydroxyl group to molecular weight ratio of at least about 1:333.

Suitable lightly branched polyether polyols which may be employed as component C include those prepared from the same compounds as the hydroxyl initiated highly branched polyether polyols except that the products have a hydroxyl group to molecular weight ratio of less than about 1:500.

Other suitable lightly branched polyether polyols include the ester-modified polyether polyols described in a copending application Ser. No. 67,233 by Robert W. McAda, Jr. having the title "Ester-Modified Polyether Polyols" filed on Aug. 26, 1970, now abandoned.

Suitable polymethylene polyphenylisocyanates which may be employed include, for example, those represented by the formula

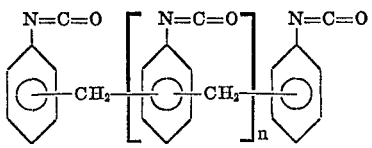

wherein $n$ has a value such that the average NCO functionality is at least 2 and preferably about 2.6.

The quantity of isocyanate employed is that which will provide an NCO:OH ratio of from about 0.50:1 to about 0.9:1 and preferably from about 0.60:1 to about 0.80:1.

Suitable cell control agents which may be employed include for example, the silicone oils, and the like.

These cell control agents may be employed in quantities of from about 0.5 to about 2.0 percent by weight based upon the combined weight of A, B and C.

Suitable organic volatile blowing agents which may be employed include, for example, aliphatic hydrocarbons boiling below 110° C. and halogenated aliphatic hydrocarbons boiling below 110° C. such as, for example, dichlorodifluoromethane, trichlorofluoromethane, methylene chloride, hexane, hexene, pentane, those suitable blowing or foaming agents disclosed in U.S. Pat. No. 3,072,582, mixtures thereof and the like. Those skilled in the art will recognize that the quantity of blowing agent will vary according to the density desired but is usually in the range of from about 25 to about 50 percent by weight based on the combined weight of A, B and C.

Other optional components which may be employed include inert fillers such as clays, talc, sodium carbonate, metal powders and the like, colorants such as pigments and/or dyes and the like, antioxidants, catalysts for urethane formation including tertiary amines such as, for example, triethylenediamine, tetramethylenediamine, tetramethylquanidine, tetramethylbutane diamine, dimethylethanol amine, salts of tin and lead such as for example, lead octoate, stannous octoate, dibutyltindilaurate, mixtures thereof and the like.

The following examples are illustrative of the present invention and are not to be construed as to limiting the scope thereof in any manner.

EXAMPLES

In each of the examples, the foam was prepared by intimately admixing all of the components except the polyisocyanate and then blending in the polyisocyanate and pouring the mixture into an open container. The components and quantities thereof and properties of the resultant foams are given in the following table.

In the following examples, the percent water pick-up was determined by immersing a 2″ x 2″ x 2″ sample in water for 3 minutes. The weight of water absorbed is determined and the percent water pick-up calculated by the following:

Vol. percent water pick-up $$= \frac{\text{weight of water absorbed} \times 100}{\text{geometric volume of sample, in cm.}^3}$$

The percent loss by the dripping test was determined by immersing a 2″ x 2″ x 2″ sample for 3 minutes. The quantity of water pick-up is determined and the weight of water which leaks from the corner of the sample when held above a container during a period of one minute is determined.

Dripping tendency is then calculated by the following:

$$\text{Percent loss} = \frac{\text{weight of water loss} \times 100}{\text{weight of water absorbed}}$$

The percent water retained is calculated by the following equation:

Percent water retained = percent water absorbed
   —(percent water absorbed × percent water loss)

For Example 2 the percent water retained = 90

$$(90 \times .05) = 90 - 4.5 = 85.5.$$

| Component and properties | Ex. 1[a] | Ex. 2 | Ex. 3 | Ex. 4 | Comparative Ex. A | Ex. 5 | Ex. 6 | Ex. 7 | Ex. 8 |
|---|---|---|---|---|---|---|---|---|---|
| A(polyol), grams/pbw.[1] | P1, 150/39.5 | P1, 150/39.5 | P1, 150/39.5 | P1, 150/39.5 | P1, 150/39.5 | P1, 284/71.5 | P1, 160/40 | P5, 155/39.5 | P5, 155/39.5 |
| B(polyol), grams/pbw | P2, 150/39.5 | P2, 150/39.5 | P2, 150/39.5 | P2, 150/39.5 | P2, 150/39.5 | None | P4, 140/35 | P2, 155/39.5 | P2, 155/39.5 |
| A+B, pbw. of (A+B+C) | 79 | 79 | 79 | 79 | 79 | 71.5 | 75 | 79 | 79 |
| C(polyol, grams/pbw | P3, 80/21 | P3, 80/21 | P3, 80/21 | P3, 80/21 | P3, 80/21 | P3, 113/28.5 | P3, 100/25 | P3, 82.7/21 | P3, 82.7/21 |
| D(isocyanate), grams | D1, 420 | D1, 420 | D1, 420 | D1, 420 | D1, 420 | D1, 400 | D1, 407.3 | D1, 407.3 | D1, 407.3 |
| E(water) grams/pbw | None | 5, 1.3 | 2.0, 0.5 | 8.0, 2.1 | 10, 2.6 | None | None | 5, 1.3 | None |
| F(blowing agent), grams | F1, 160 | F1, 160 | F1, 160 | F1, 160 | F1, 160 | F1, 160 | F1, 160 | F1, 160 | F1, 160 |
| G(catalyst), grams | None | None | None | None | None | None | None | None | None |
| H(cell control agent), grams | H1, 4 | H1, 4 | H1, 4 | H1, 4 | H1, 4 | H1, 4 | H1, 4 | H1, 4 | H1, 4 |
| NCO:OH ratio | 0.75:1 | 0.67:1 | 0.72:1 | 0.63:1 | 0.60:1 | 0.75:1 | 0.77:1 | 0.63:1 | 0.71:1 |
| Density, lbs./ft.³ | 1.88 | 1.48 | 1.60 | 1.30 | 1.2 | 2.0 | 1.62 | 1.45 | 1.8 |
| Compression yield strength, p.s.i. | 7.1 | 8.8 | 7.1 | 10.1 | 11.0 | 18 | 12.0 | 9.0 | 7.5 |
| Water pick-up (3 min.) percent by vol. | >90 | >90 | >90 | 72 | >50 | 83 | 87 | 90 | 90 |
| Dripping tendency, percent loss | 60 | 5 | 14.5 | 7 | 5 | 10 | 6 | 5 | 60 |
| Water retained, percent | 36 | 85.5 | 77 | 67 | 47.5 | 74.7 | 81.8 | 85.5 | 36 |
| Suggested utility[2] | B or F | F1 | F1 | F1 | None | F1 | F1 | F1 | B or F |

| Component and properties | Comparative Ex. B | Ex. 9 | Ex. 10 | Ex. 11 | Ex. 12 | Comparative Ex. C | Ex. 13 | Comparative Ex. D | Comparative Ex. E |
|---|---|---|---|---|---|---|---|---|---|
| A(polyol), grams/pbw.[1] | P1, 163/46.5 | P1, 150/39.5 | P1, 150/39.5 | P1, 150/37.5 | P1, 150/73.5 | P1, 150/38.75 | P1, 170/37.5 | P1, 131/37 | P1, 133.4/37.1 |
| B(polyol), grams/pbw | P2, 163/46.5 | P2, 150/39.5 | P2, 150/39.5 | P2, 150/37.5 | P2, 150/37.5 | P2, 120/38.75 | P2, 170/37.5 | P2, 192.5/54 | P2, 184.6/51.4 |
| A+B, pbw. of (A+B+C) | 93 | 79 | 79 | 79 | 79 | 79 | 79 | 91 | 88.5 |
| C(polyol, grams/pbw | P3, 24.4/7 | P3, 80/21 | P6, 80/21 | P7, 100/25 | P8, 100/25 | P3, 70/22.5 | P3, 110/25 | P3, 32.4/9 | P3, 41.1/11.5 |
| D(isocyanate), grams | D1, 450 | D1, 420 | D1, 420 | D1, 400 | D1, 400 | D1, 490 | D1, 160 | D1, 443.5 | D1, 441 |
| E(water) grams/pbw | None | None | None | None | None | None | None | None | None |
| F(blowing agent), grams | F1, 160 | F1, 160 | F1, 160 | F1, 160 | F1, 150 | F1, 150 | F1, 160 | F1, 160 | F1, 160 |
| G(catalyst), grams | None | G1, 2 | None | None | None | None | None | None | None |
| H(cell control agent), grams | H1, 4 | H1, 4 | H1, 4 | H1, 4 | H1, 4 | H1, 4 | H1, 4 | H1, 5 | H1, 5 |
| NCO:OH ratio | 0.75:1 | 0.72:1 | 0.75 | 0.77 | 0.77 | 1.10 | 0.55 | 0.75 | 0.75 |
| Density, lbs./ft.³ | 1.50 | 1.9 | 1.8 | 2.0 | 2.0 | 1.9 | 1.97 | 1.9 | 2.0 |
| Compression yield strength, p.s.i. | 16 | 11.0 | 7.0 | 8.0 | 8.0 | 1.9 | 3.0 | N.D. | N.D. |
| Water pick-up (3 min.) percent by vol. | 18 | 90 | >90 | >90 | >90 | 55 | >90 | 10 | 15 |
| Dripping tendency, percent loss | N.D. | 6 | 60 | 38 | 40 | 10 | 45 | N.D. | N.D. |
| Water retained, percent | N.D. | 84.6 | 36 | 56 | 54 | 49.5 | 49.5 | N.D. | N.D. |
| Suggested utility[2] | None | F1 | B or F | B or F | B or F | None | B or F | None | None |

See footnotes at end of table.

TABLE—Continued

| Component and properties | Comparative Ex. F | Comparative Ex. G | Comparative Ex. H | Ex. 14 | Ex. 15 | Ex. 16 | Ex. 17 | Ex. 18 | Ex. 19 |
|---|---|---|---|---|---|---|---|---|---|
| A (polyol), grams/pbw.[1] | P1, 135/37.1 | P1, 84/23 | P1, 130/38 | P1, 136.2/37 | P1, 277/50 | P1, 258/60 | P1, 85/23 | P1, 150/38 | P1, 150/38 |
| B (polyol), grams/pbw. | P2, 181.9/50 | P2, 234/64 | P2, 130/38 | P2, 178.3/48.6 | None | None | P2, 232/63 | P2, 150/38 | P2, 150/38 |
| A+B, pbw. of (A+B+C). | 87.1 | 87 | 76 | 85.6 | 50 | | 86 | 76 | 76 |
| C (polyol), grams/pbw. | P3, 46.8/12.9 | P3, 48/13 | P3, 80/24 | P3, 52.6/14.4 | P3, 227/50 | P3, 172/40 | P3, 51/14 | P3, 80/24 | P3, 80/24 |
| D (isocyanate), grams | D1, 463.3 | D1, 434 | D1, 460 | D1, 433 | D1, 345 | D1, 370 | D1, 432 | D2, 420 | D1, 420 |
| E (water) grams/pbw | None | None | None | None | None | None | None | None | None |
| F (blowing agent), grams. | F1, 160 | F1, 160 | F1, 160 | F1, 160 | F1, 160 | F1, 160 | F1, 160 | F1, 160 | F1, 160 |
| G (catalyst), grams | None | G1, 1 | None | None | None | None | G1, 1 | None | None |
| H (cell control agent), grams. | H1, 5 | H1, 4 | H1, 4 | H1, 5 | H1, 4 | H1, 4 | H1, 4 | H1, 5 | H2, 4 |
| NCO:OH ratio | 0.75 | 0.75 | 0.96 | 0.75 | 0.75 | 0.75 | 0.75 | 0.75 | 0.67 |
| Density, lbs./ft.³ | 2.0 | 1.75 | 2.0 | 1.9 | 1.9 | 1.9 | 1.75 | 1.9 | 1.78 |
| Compression yield strength, p.s.i. | N.D. | N.D. | N.D. | 5 | 1 | 3 | 7 | 8.0 | 8.7 |
| Water pick-up (3 min.) percent by vol. | 53 | 55 | 47 | 88 | 90 | 90 | 88 | 90 | 85 |
| Dripping tendency, percent loss. | N.D. | N.D. | N.D. | 10 | 60 | 30 | 18 | 10 | 3 |
| Water retained, percent | N.D. | N.D. | N.D. | 79.2 | 46 | 63 | 72.2 | 81 | 82.5 |
| Suggested utility [2] | None | None | None | F1 | B or F | F1 | F1 | F1 | F1 |

[1] Percent by weight based upon the combined weights of A, B, and C.
[2] F1=floral foam, F=filter foam, B=baffle foam.
[3] Ex. 1 foam had an air flow volume of 5.0 ft.³/min. as determined by ASTM-D-1564-69.

Note.—Polyol P1 is an amine initiated polyether polyol that is the reaction product of about 3 moles of propylene oxide with aminoethylethanolamine having a molecular weight of about 280 and a hydroxyl group to molecular weight ratio of about 1:70; Polyol P2 is a hydroxyl initiated polyether polyol that is the reaction product of glycerine with ethylene oxide having a molecular weight of about 225 and a hydroxyl group to molecular weight ratio of about 1:74; Polyol P3 is the reaction product of glycerine and propylene oxide end-capped with ethylene oxide sold commerically as Varanol® CP-4701 having a molecular weight of about 4700 and a hydroxyl group to molecular weight ratio of about 1:1565; Polyol P4 is the reaction product of glycerine with propylene oxide having a hydroxyl group to molecular weight ratio of about 1:86; Polyol P5 is the reaction product of diethylene triamine with propylene oxide at a molar ratio of about 1 to 5 respectively and having a hydroxyl group to molecular weight ratio of about 1:79; Polyol P6 is the reaction product of P3 with about 3 moles of maleic anhydride and about 6 moles of ethylene oxide the resultant product having a hydroxyl group to molecular weight ratio of about 1:1635. Polyol P7 is a polyoxypropylene glycol having a hydroxyl to molecular weight ratio of about 1:2000; Polyol P8 is a polyoxypropylene glycol having a hydroxyl to molecular weight ratio of about 1:1000; Isocyanate D1 is a polymethylene polyphenylisocyanate having an NCO equivalent weight of about 134 and an average functionality of about 2.8; Isocyanate D2 is a polymethylene polyphenylisoxyanate having an NCO equivalent weight of about 131 and an average functionality of about 2.3; Catalyst G1 is dimethylethanolamine Blowing Agent F1 is CFCl₃; Cell Control Agent H1 is a silicone oil, DCXF11546 sold commercially by Dow Corning Corp.; Cell Control Agent H2 is a silicone oil, SF-1066 sold commercially by General Electric; N.D.=Not determined.

EXAMPLE 20

A baffle foam was prepared employing the formulation

| | Parts |
|---|---|
| Polyol P1 | 150 |
| Polyol P2 | 150 |
| Polyol P3 | 80 |
| Isocyanate D1 | 420 |
| Blowing agent F1 | 160 |
| Cell control agent H1 | 4 | according to the following procedure.

All of the components except the isocyanate were mixed, then the isocyanate was added and the mixture stirred vigorously for 10 seconds and poured into a 16-ounce glass bottle. The foam was trimmed flush with the top of the bottle. The foam was wetted with 250 ml. of gasoline which was subsequently removed by allowing the gasoline to drip until the dripping stopped. Then 185 grams of gasoline was poured into the bottle which was then inverted and the gasoline was collected for a period of 1 minute during which time 172 grams was recovered which represented a recovery of 93% of the gasoline added.

A foam of the same composition as above had the following properties

NCO:OH ratio=0.75
Density=1.88 lbs./ft.³.
Compressive yield strength=7.1 p.s.i.
Water pick-up=90%
Dripping tendency=60%
Water retained=36
Suggested utility=baffle or filter foam

We claim:

1. A polyurethane foam composition which absorbs at least about 70 percent by volume of water, said foam resulting from subjecting to foaming conditions a composition comprising:

(A) at least about 20 percent by weight based upon the combined weight of A, B, and C of an amine initiated polyether polyol having a hydroxyl group to molecular weight ratio of at least about 1:333, (B) from about 0 to about 46 percent by weight when the combined weight of A and B is greater than 86.5 but less than about 92 percent and from about 0 to about 63 percent by weight when the combined weight of A and B is greater than about 20 percent but less than about 86.5 percent by weight based upon the combined weight of A, B, and C of a hydroxyl initiated polyether polyol having a hydroxyl group to molecular weight ratio of at least about 1:333, (C) from about 9 to about 50 percent by weight based upon the combined weight of A, B, and C of a hydroxyl initiated polyether polyol having a hydroxyl group to molecular weight ratio of less than about 1:500, (D) a polymethylene polyphenylisocyanate having a functionality of from at least about 2 to about 3.2, (E) from about 0 to about 2.4 percent by weight of the combined weights of A, B, and C of water, (F) a volatile organic blowing agent, (G) from about 0 to about 0.5 percent by weight based upon the combined weight of A, B and C of a catalyst for urethane formation, and (H) a silicone oil cell control agent, wherein the isocyanate, component D, is employed in a quantity that will provide an NCO:OH ratio of from about 0.5:1 to about 0.9:1.

2. The composition of claim 1 wherein component C is employed in a quantity of from about 10 to about 33 percent and the NCO:OH ratio is from about 0.6:1 to about 0.8:1.

3. The composition of claim 2 wherein the amine initiated polyether polyol, component A, is the reaction product of propylene oxide with aminoethylethanolamine or diethylenetriamine.

4. The composition of claim 2 wherein the polyether polyol, component B, is the reaction product of glycerine with ethylene oxide.

(References on following page)

References Cited

UNITED STATES PATENTS

| | | | |
|---|---|---|---|
| 3,457,203 | 7/1969 | Cohen et al. | 260—2.5 |
| 2,977,330 | 3/1961 | Brower | 260—2.5 |
| 3,471,416 | 10/1969 | Fijal | 260—2.5 |

FOREIGN PATENTS

| | | | |
|---|---|---|---|
| 254,818 | 2/1961 | Australia | 260—2.5 |
| 924,111 | 4/1963 | Great Britain | 260—2.5 |
| 1,154,161 | 6/1969 | Great Britain | 260—2.5 |

DONALD E. CZAJA, Primary Examiner
E. C. RZUCIDLO, Assistant Examiner

U.S. Cl. X.R.

260—2.5 AQ

UNITED STATES PATENT OFFICE
CERTIFICATE OF CORRECTION

PO-1050 (5/69)

Patent No. 3,746,666      Dated July 17, 1973

Inventor(s) Gerald Wayne Neal and Llewellyn Delphin Booth

It is certified that error appears in the above-identified patent and that said Letters Patent are hereby corrected as shown below:

Col. 4, line 40, place a minus sign before "(90 X .05)".

In the Table at Col. 3 and 4, opposite A (polyol) in Ex. 12, change "73.5" to --37.5--.

In the Table at Col. 3 and 4 opposite A (polyol) in Comparative Ex. C, change "150" to --120--.

In the Table at Col. 3 and 4 opposite C (polyol) in Ex. 12, change "P8." to --P8,--

In the Table at Col. 5 and 6 opposite E (water) in Ex. 19, change "none" to --5--.

In the footnote to the Table at Col. 5 and 6, change the first word in the third line from the bottom from "polyphenylisoxyanate" to --polyphenylisocyanate--.

Signed and sealed this 12th day of November 1974.

(SEAL)
Attest:

McCOY M. GIBSON JR.
Attesting Officer

C. MARSHALL DANN
Commissioner of Patents